United States Patent Office 3,770,799
Patented Nov. 6, 1973

3,770,799
ACYCLIC NITRILES
Kuno Wagner and Manfred Hajek, Leverkusen, Germany, assignors to Bayer Aktiengesellschaft, Leverkusen, Germany
No Drawing. Original application Nov. 26, 1969, Ser. No. 880,420. Divided and this application Jan. 27, 1972, Ser. No. 221,413
Claims priority, application Germany, Dec. 14, 1968, P 18 14 832.8
Int. Cl. C07c *121/42*
U.S. Cl. 260—465.5 R        2 Claims

ABSTRACT OF THE DISCLOSURE

Novel aldimines and ketimines which contain hydroxymethyl groups are provided. These new compounds are prepared by reacting Schiff's bases which have active hydrogen atoms in α-position to the >C=N group with formaldehyde or formaldehyde yielding compounds. The new compounds can be used as plasticizing agents for the preparation of polyurethane plastics.

CROSS-REFERENCE TO RELATED APPLICATION

This application is a division of application Ser. No. 880,420 filed Nov. 26, 1969.

ALDIMINES AND KETIMINES WHICH CONTAIN HYDROXYMETHYL GROUPS AND A PROCESS FOR THEIR PREPARATION

Mono- and polyketimines and aldimines have recently attracted interest in the diisocyanate polyaddition process because they react as masked amines and polyamines with polyisocyanates or with masked polyisocyanates, the reaction resulting in chain lengthening or cross-linking. These ketimines, for example, react with the polyisocyanates either via cycloaddition reactions of the azomethine group or in the presence of moisture, with the formation of α-hydroxyamino compounds. In addition, depending on the carbonyl component in the ketimine, NH groups which are formed during the formation of enamines may react with the polyisocyanates, so that when polyketimines react with polyisocyanates several reactions eventually take place simultaneously and these contribute to the chain lengthening or chain branching of the macromolecule.

In practical terms, it is particularly the bisketimines, which are easily commercially available from many carbonyl compounds, and aliphatic, cycloaliphatic and araliphatic diamines, which exhibit serious disadvantages in their reaction with polyisocyanates. Thus, very many ketimines have an unpleasant, amine-like odour which does not always completely disappear even after the reaction with the polyisocyanates has been completed. Furthermore, ketimines obtained from aliphatic and cycloaliphatic polyamines are usually much too highly reactive with aromatic polyisocyanates, so that difficulties arise in working up. One particular disadvantage, however, resides in the fact that in the presence of moisture, ketimines are not sufficiently stable in storage for practical purposes, and that when ketimines are deliberately used in the presence of moisture the ketone component of the ketimine is partly released by way of the α-hydroxylamine which forms. This not only results in unwanted softening effects in the resulting diisocyanate polyaddition products, but also results in the finished moulded articles having an unpleasant odour due to the ketone component liberated.

The invention relates to new ketimines and/or aldimines which contain hydroxymethyl groups, the ketone component of which containing hydroxyl groups, which are reactive with isocyanates, and which do not have the above mentioned disadvantages.

The present invention thus relates to hydroxyl-containing aldimines or ketimines of the following general formula

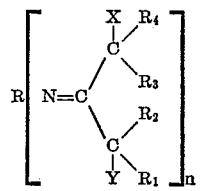

in which

R is an n-valent $C_1$–$C_{18}$ saturated aliphatic radical, an n-valent $C_4$–$C_{10}$ saturated alicyclic hydrogen,

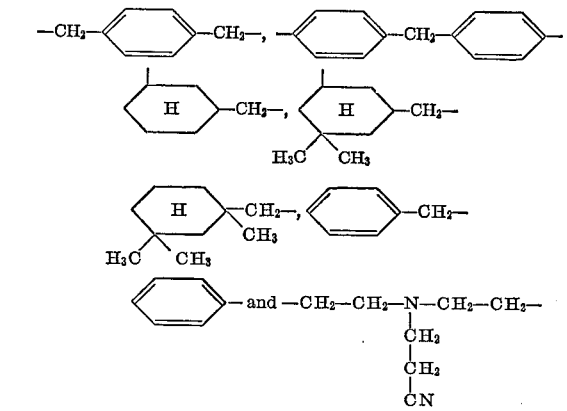

wherein $R_1$ and $R_2$ are each selected from the group consisting of (a) hydrogen, (b) $C_1$–$C_{18}$ alkyl, $C_4$–$C_{10}$ cycloalkyl, substituted derivatives thereof wherein the substituent is cyanoethyl,

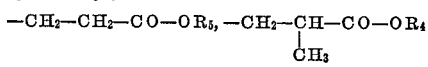

or

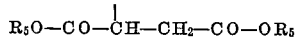

wherein $R_5$ is $C_1$–$C_{18}$ alkyl or $C_4$–$C_{10}$ cycloalkyl and (c) hydroxymethyl; $R_3$ and $R_4$ are each selected from the group consisting of hydrogen, $C_1$–$C_{18}$ alkyl, $C_4$–$C_{10}$ cycloalkyl and hydroxymethyl; $R_2$ and $R_3$ when taken together form a trimethylene bridge between the carbon atoms to which they are attached; X is hydrogen cyanoethyl,

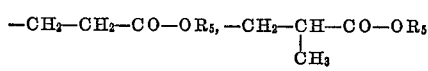

or

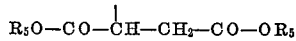

wherein $R_5$ is as aforesaid; Y is hydrogen or hydroxymethyl and $n$ is an integer from 1 to 2.

The following are examples of the compounds according to the invention:

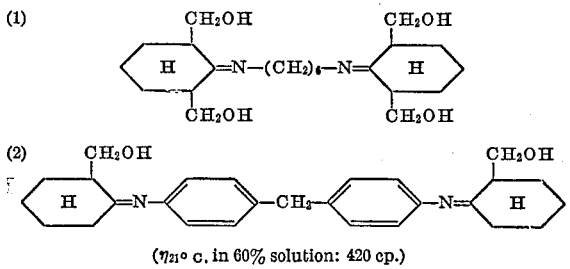

($\eta_{21°}$ c. in 60% solution: 420 cp.)

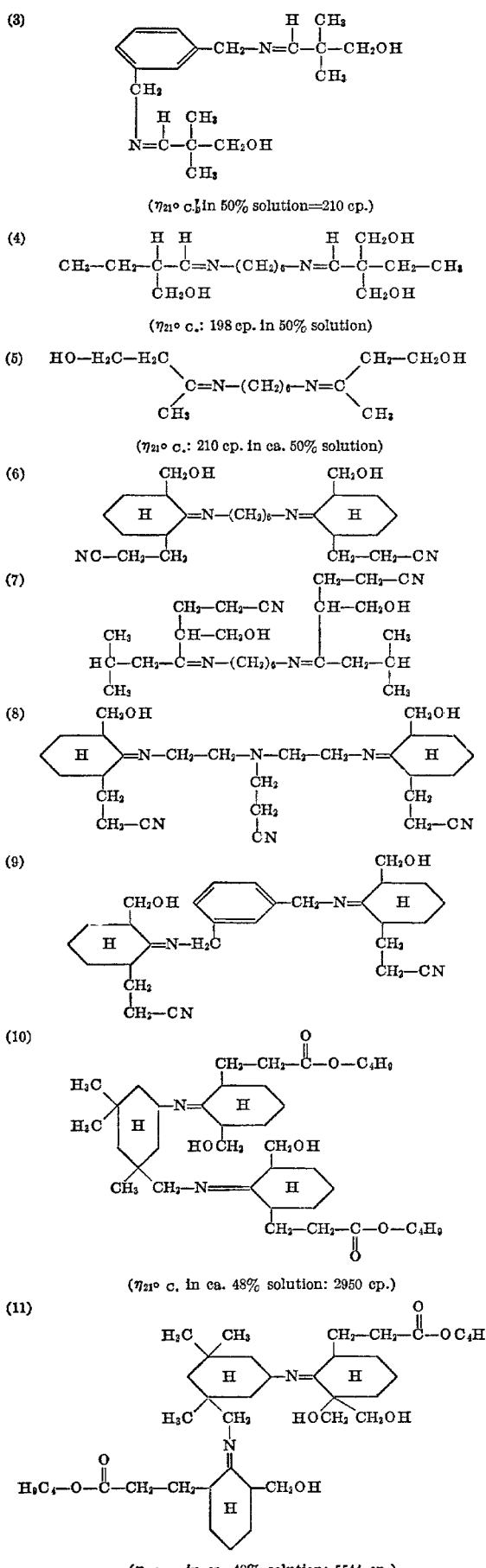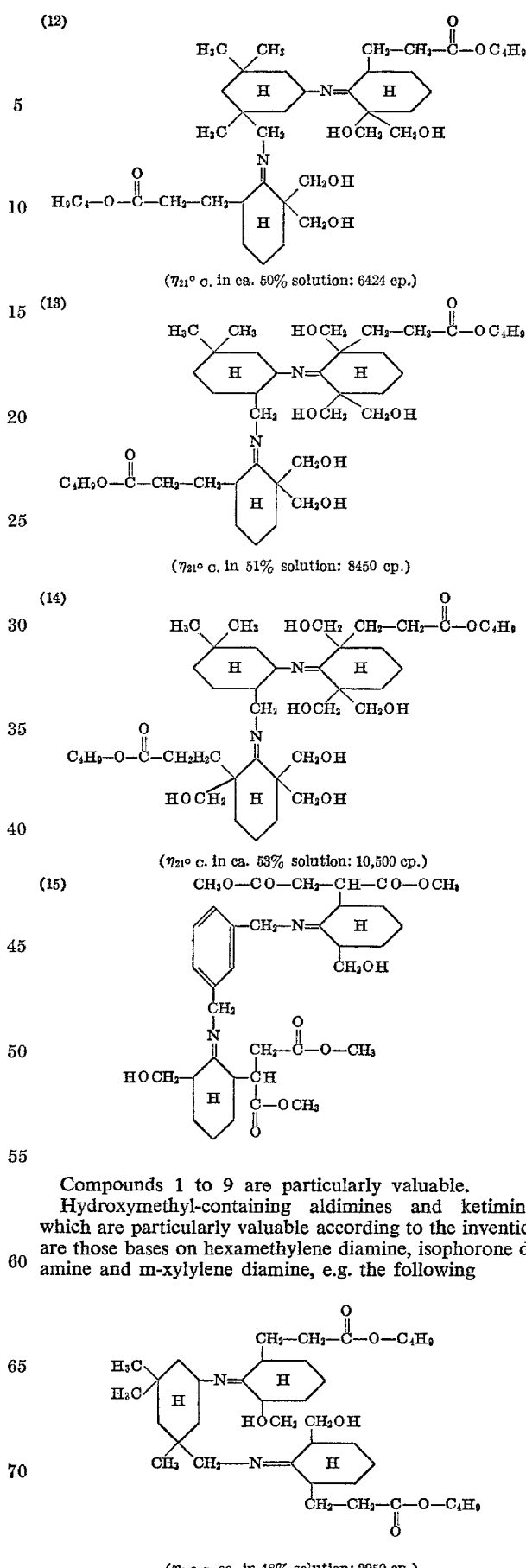
Compounds 1 to 9 are particularly valuable.
Hydroxymethyl-containing aldimines and ketimines which are particularly valuable according to the invention are those bases on hexamethylene diamine, isophorone diamine and m-xylylene diamine, e.g. the following

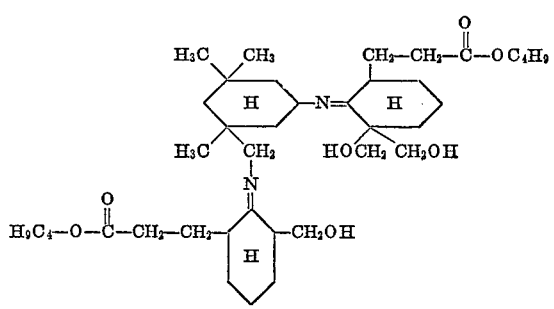

($\eta_{21°}$ c. in ca. 49% solution: 5544 cp.)

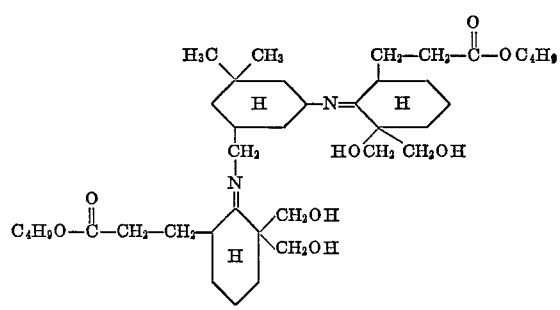

($\eta_{21°}$ c. in ca. 50% solution: 6424 cp.)

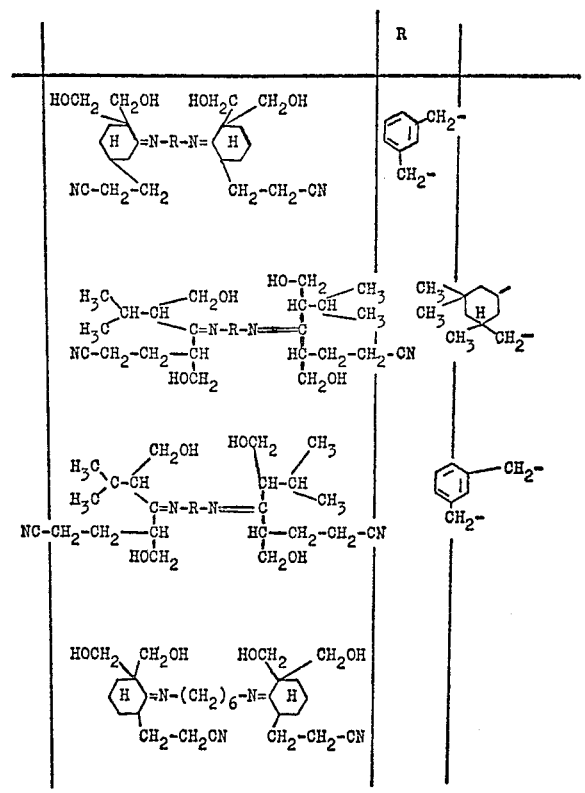

The insertion of hydromethyl groups into ketimines and aldimines has not hitherto been known. Syntheses, e.g. by the condensation of various methylol ketones or permethylated ketones such as tetramethylolcyclohexanone, are unsuccessful since, according to Mannich, Ber. 56, 833 (1923), the keto group cannot be made to react in the required manner with the usual carbonyl reagents such as phenyl hydrazine, hydroxylamine and semicarbazide. It has also been shown that even pure tetramethylolcyclohexanone which is completely free from formaldehyde and which has a melting point of 139° C. will not react in accordance with Equation I indicated below, for example with hexamethylene diamine, but reacts exclusively according to Equation II, an amorphous, white, insoluble reaction product being formed from hexamethylene diamine and formaldehyde, namely the well known three-dimensionally cross-linked polymer of N,N'-bis-methylene hexamethylenediamine.

(I)

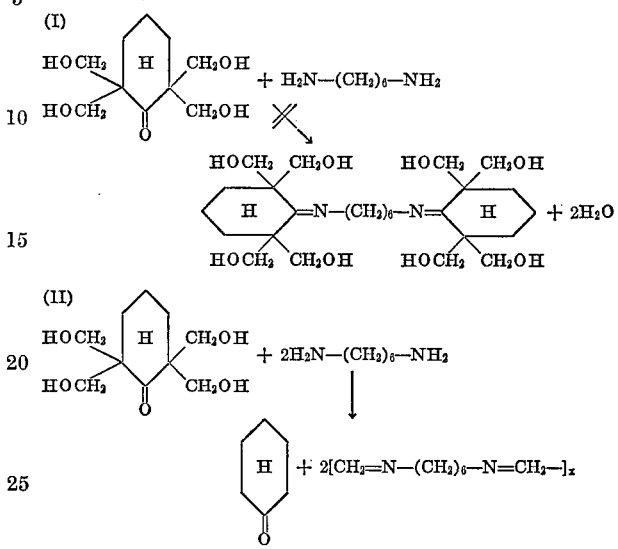

Surprisingly, it has now been found that many different organic condensation products of aldehydes or ketones and amines, provided that they contain at least one ketimine and/or aldimine group in their molecule (Schiff's bases) react very easily and in almost quantitative yields with formaldehyde, retaining their azomethine group and forming new ketimines and aldimines which are partially or quantitatively hydroxymethylated in the $\alpha$-position to the azomethine group. New ketimines with hydroxyl group content can be prepared in this way particularly in the polyketimine series. These new ketimines represent important reactants for the diisocyanate polyaddition process.

The invention thus also relates to a process for the preparation of hydroxymethyl-containing aldimines and ketimines, which consists in that Schiff's bases of the general formula

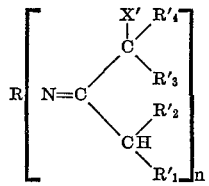

wherein R is an n-valent $C_1$–$C_{18}$ saturated aliphatic radical, an n-valent $C_4$–$C_{10}$ saturated alicyclic hydrocarbon,

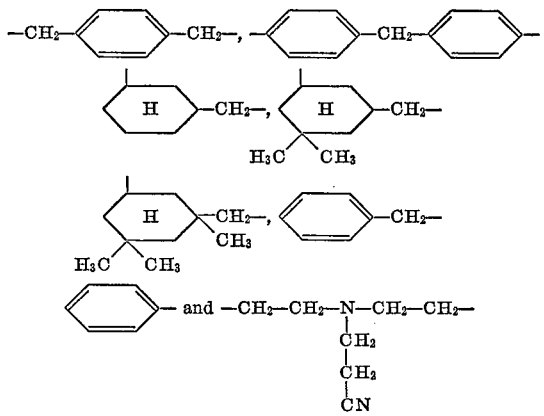

$R'_1$ and $R'_2$ are each selected from the group consisting of (a) hydrogen, (b) $C_1$–$C_{18}$ alkyl, $C_4$–$C_{10}$ cycloalkyl, substituted derivatives thereof wherein the substituent is cyanoethyl, —CH₂—CH₂—CO—OR₅,

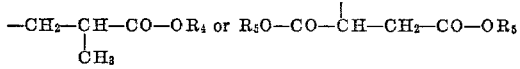

wherein R₅ is $C_1$–$C_{18}$ alkyl or $C_4$–$C_{10}$ cycloalkyl and $R'_3$ and $R'_4$ are each selected from the group consisting of hydrogen, $C_1$–$C_{18}$ alkyl, $C_4$–$C_{10}$ cycloalkyl, $R'_2$ and $R'_3$ when taken together form a trimethylene bridge between the carbon atoms to which they are attached; X is hydrogen, cyanoethyl, —CH₂—CH₂—CO—OR₅,

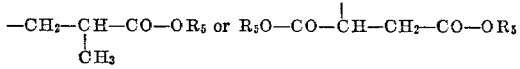

wherein R₅ is as aforesaid and $n$ is an integer from 1 to 2, at −10 to 150° C. with a compound selected from the group consisting of formaldehyde, semiacetals of formaldehyde and substances which give off formaldehyde which compound has a maximum water content of 3% by weight.

The quality of and the absence of water in the monomeric formaldehyde is often of great importance for carrying out the process of the invention. The maximum water content of the gaseous formaldehyde, semiacetals of formaldehyde and/or compounds which split off formaldehyde should be 3% by weight. Preferably these compounds have a maximum water content of 0.5% by weight. Most preferably anhydrous gaseous formaldehyde is used. The water content is of great importance especially in the case of ketimines which are particularly sensitive to hydrolysis. The reaction according to the invention can be carried out with gaseous formaldehyde, paraformaldehyde, oligomers or polymers of formaldehyde or with semiacetals which may be monovalent or polyvalent semiacetals, e.g. semiacetals of monomeric formaldehyde and methanol, ethanol, propanol, butanol, ethylene glycol, diethylene glycol, triethylene glycol, glycerol, and hexanetrio (see examples).

In general, formaldehyde, semiacetals of formaldehyde and/or compounds which give off formaldehyde may be used for the reaction with Schiff's bases according to the given formula. Monomeric, anhydrous, gaseous formaldehyde, semiacetals of formaldehyde obtained from formaldehyde and mono- or polyalcohols, p-formaldehyde and/or oligomeric and high molecular weight polyoxymethylenes which have not been stabilized with regard to the end groups are preferred.

The process according to the invention may be carried out in the absence or presence of inert solvents such as benzene, toluene, xylene, butylacetate or carbon tetrachloride, at as a rule temperatures of −10 to 150° C. and preferably at temperatures of 30° C. to 70° C. It is surprising that even when extremely pure formaldehyde is used, the very marked tendency of formaldehyde to undergo polymerisation is completely suppressed, so that no formation of high molecular weight polyoxymethylenes occurs in the process according to the invention; instead, readily soluble, hydroxyl-containing polyketimines and/or aldimines are obtained which have excellent solubility in many organic solvents.

The ketimines and/or aldimines which may be used as starting material for the process according to the invention, which have the following formula

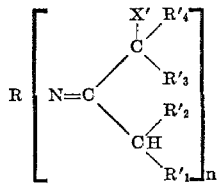

in which R, $R_1'$, $R_2'$, $R_3'$, $R_4'$, $X'$ and $n$ have the meaning already indicated above, can be prepared in known manner by condensation or mixed condensation of ketones and/or aldehydes (with the exception of formaldehyde) with primary mono- and/or polyamines.

These primary mono- and/or polyamines have the general formula $$R[NH_2]_n$$

in which R and $n$ have the meaning already mentioned above.

The following are mentioned as examples of suitable monoamines: Methylamine, ethylamine, propylamine, isopropylamine, butylamine, isobutylamine, tertiary butylamine, amylamine, allylamine, isoamylamine, dodecylamine, tetradecylamine, 3-methoxy-propylamine, 3-ethoxy-propylamine, 3 - butyloxy - propylamine, myristylamine, hexadecylamine, stearylamine, cyclohexylamine, benzylamine, aniline, o-, m- and p- toluidine, o-, m- and p-chloroaniline, o-, m- and p-nitroaniline, o-, m- and p-nitroaniline, and p-anisidine.

The following are mentioned as examples of polyamines: Ethylene diamine, propylene diamine, 1,4-diaminobutane, hexamethylenediamine, trimethylhexamethylenediamine, diaminomethylcyclobutane (prepared by hydrogenation of dimerised acrylonitrile) diethylenetriamine, triethylenetetramine, tetraethylenepentamine, pentaethylenehexamine, 1,2-diaminopropane, dipropylene triamine, tripropylenetetramine, 3-amino-1-methylaminopropane, 3 - aminodimethylaminopropane, 3,3' - diamino-dipropylamine, methyl-bis-(3-aminopropyl)-amine, α,ω-diamino-caproic acid methylester, hydrogenated thiodipropionic acid dinitrile, 3,3'-diaminodipropylether, propylene glycol polyethers which contain primary amino end groups, which can be obtained from oligomeric polymerisation of polyaddition products of propylene oxide (ethylene oxide) by reacting them with ammonia under pressure in the presence of nickel as catalyst, hydrogenated p-phenylenediamine, hydrogenated 4,4' - diaminodiphenyl methane, hydrogenated diamines of 4,4'-diamino-diphenylether and 4,4'-diaminodiphenylthioether, m- and p-xylylene diamine, isophorone diamine, aromatic diamines such as 2,4-diamino-toluene, 2,6-diaminotoluene, 4-amino-2-acetylaminotoluene, dimethyl - (4 - aminobenzyl)-amine, 1,3-bisaminomethyl-4,6-dimethylbenzene, 2,4-diamino-3,5-diethyltoluene, 2,6 - diamino - 3,5 - diethyltoluene, 2,4-diamino - 1,3,5-triisopropylbenzene, 4,4'-diamino-diphenylmethane, 4,4'-diamino-diphenylether and -thioether, oligomeric polyamines which can be obtained by acid condensation of aniline and formaldehyde, m- and p-phenylene diamine, 1,4- and 1,5-naphthylene diamine, 3,3'-diamino - 3,3'-dichloro-diphenylmethane, 4,4'-diamino-3,3'-dichloro-diphenylether, 4,4' - diamino - diphenyldimethylmethane, 1,1-bis(4-aminophenyl)-cyclohexane, 4,4',4''-triamino-triphenyl methane or polyamines containing urethane groups or urea groups, which can be prepared e.g. by reacting p-nitrophenylisocyanate with low molecular weight polyols such as ethylene glycol, 1,4-butanediol, or hexanediol or with diamines such as hexamethylene diamine followed by hydrogenation.

Aminoalcohols and their derivatives may also be used for preparing the Schiff's bases which are to be used as starting material according to the invention, e.g. 2-aminoethanol, 3-aminopropanol, 4-aminobutanol-(2), and the hydrogenation derivative of the addition products of acrylonitrile with monohydric and polyhydric alcohols such as methanol, ethanol, butanol, ethylene glycol, butanediol, hexanediol, bishydroxy-alkylated diols, neipentyl glycol, diethylene glycol, triethylene glycol, hydroquinone, and 4,4'-dihydroxy-diphenyldimethylmethane and hydrogenation products of cyanoethylated mono and polyamines in general.

Among the polynuclear aromatic polyamines or polyamines which contain aromatic polyether radicals, it is particularly advantageous to use those which can be prepared e.g. by acid catalysed condensation of aniline with formaldehyde and those which can be prepared from bis-epoxides, e.g. from 4,4' - dihydroxy - dimethyldiphenylmethane and epichlorohydrine by reacting them with a large excess of e.g. ethylene diamine, tetramethylene diamine, hexamethylene diamine, m- and p- xylylene diamine or isophorone diamine, i.e. polyamines which have primary amino groups, additional hydroxyl groups and secondary NH groups which are formed by addition to the oxirane ring.

For the reaction with primary amines, aldehydes and/or ketones of the general formula may be used

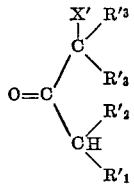

in which $R_1'$, $R_2'$, $R_3'$, $R_4'$ and $X'$ have the meaning already mentioned.

The following are mentioned as examples of aldehydes: Acetaldehyde, propionaldehyde, n-butyraldehyde, isobutyraldehyde, valeric aldehyde, isovaleric aldehyde, caproic aldehyde, oenanthaldehyde, formylcyclohexane, phenylacetaldehyde and hydrocinnamic aldehyde.

The following are examples of suitable ketones: Acetone, methyl ethyl ketone, methyl-n-propyl ketone, diethyl ketone, methylisobutyl ketone, methyl-n-amyl ketone, diisobutylketone, methyl-tertiary butyl ketone, methyl-n-heptyl ketone, acetylacetone, acetonyl acetone, acetophenone, propiophenone, cyclopentanone, cyclohexanone, 1-methyl-cyclohexanone - (2), 1-cyclohexanedione - (1,4), acetylcyclohexanone and cyclododecanone.

The Schiff's bases prepared from amines and aldehydes or ketones are particularly advantageous to use for the process according to the invention if they have been partially cyanoethylated in the α-position to the azomethine group in known manner in a preliminary reaction, e.g. with acrylonitrile. At least one hydrogen atom which is reactive with formaldehyde should remain in the α-position to the azomethine group. Examples of such Schiff's bases which are particularly preferred are aldimines such as 2-(β-cyanoethyl)-N-cyclohexylbutyraldimine, 2-(β-cyanoethyl)-N-cyclohexyloenanthaldimine, 2-(β - cyanoethyl)-N-butyl-butyraldimine, and 2-(β-cyanoethyl)-N-phenyl-butyraldimine. These can be prepared, e.g., by the process described in German patent specification 951,568. This process can also be applied to preparing many different cyanoethylation products of different bisketimines of aliphatic, cycloaliphatic, araliphatic or aromatic polyamines with aliphatic, cycloaliphatic or araliphatic ketones, or similarly, cyanoethylation products of mono-ketimines such as N-cyclohexyl-2-(β-cyanoethyl)-cyclohexanoneimine, N-cyclohexyl-2,6-di-(β - cyanoethyl)-cyclohexanoneimine, N-n-butyl-2-(β-cyanoethyl)-cyclohexanoneimine, and N-phenyl - 2 - (β-cyanoethyl)-cyclohexanoneimine.

The ketimines which are particularly advantageous to use according to the invention are reaction products of ethylene diamine, hexamethylenediamine, m- and p-xylylene diamine, isophorone diamine, diethylene triamine, triethylenetetramine and the diamine

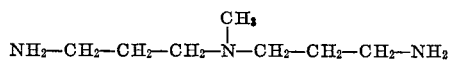

with acetone, cyclohexanone, isophorone and methylisobutyl ketone.

Ketimines which have at least one or two hydrogen atoms in the α-position to the C atom of the C=N bond are particularly suitable according to the process of the invention if the molecule contains several C=N groups. Highly functional polyketimines and/or aldimines which contain hydroxyl groups can then be prepared.

In view of the preferred use of the products of the process as reactants for mono and polyisocyanates, the most advantageous ketimines and/or aldimines to use are those which are, in general, partially substituted in the α-position to the azomethine group by Michael addition, e.g. with acrylonitrile, methyl acrylate, ethyl acrylate, propyl acrylate, buty acrylate, methylmethacrylate, ethylmethacrylate, β-hydroxyethylacrylate, β-hydroxyethylmethacrylate, β-hydroxypropylacrylate, β-hydroxypropylmethacrylate, acrylamide - N - methylolmethylether, N,N-dimethylacrylamide, vinyl chloride, methyl vinyl sulphone and diesters of maleic and fumaric acid and particularly their bis-hydroxy esters which may be prepared, for example, by known methods from 1 mol of maleic acid anhydride and 2 mols of ethylene glycol or diethylene glycol, trimethylene glycol, 2,2-dimethylpropane-1,3-diol, glycerol, trimethylolpropane or thiodiglycol. The above mentioned compounds obtained by Michael additions, with the exception of the cyanoethylation products, can conveniently be obtained, e.g. by reacting mono- or polyimines of the formula

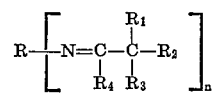

in which

R has the meaning given above, $R_4$ represents hydrogen, alkyl, cycloalkyl, aralkyl or aryl radicals or, together with $R_3$ form a tetramethylene bridge between the carbon atoms to which they are attached $R_1$, $R_2$ and $R_3$ independently of each other represent hydrogen, alkyl, cycloalkyl, aralkyl or aryl radicals with the restriction that one of these radicals must be hydrogen, and $n$ represents an integer of from 1 to 2, with an electrophilic olefin of e.g. the formula

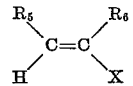

in which $R_5$ represents hydrogen or —CO—O—alkyl, $R_6$ represents a hydrogen, cyanogen or —CO—O—alkyl radical and X represents hydrogen or a methyl group at temperatures of between 10 and 150° C., optionally under pressure and optionally in an inert solvent.

The Michael addition products of the above mentioned polarised vinyl compounds with bis-ketimines obtained from the following compounds are of particular interest: Hexamethylene diamine and acetone, cyclohexanone, methylisobutyl ketone and isophorone, and ketimines formed from the same carbonyl compounds and diamines of trimethylhexamethylene diamine, m- and p-xylylene diamine, isophorone diamine, the methyl ester of α,ω-diaminocaproic acid, 2,4-toluene diamine, the tetramine of 1 mol of formaldehyde and 2 mols of toluylene-2,4-diamine, m-phenylene diamine, p-phenylenediamine, 4,4'-diaminodiphenylmethane and 4,4'-diaminodiphenylether; also, the more strongly basic bis-ketimines of the above mentioned ketones with

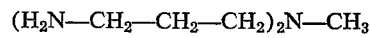

(=methyl-bis(3-aminopropyl) amine, or with aromatic polyamines which contain more than 3 or 4 amino groups, such as can be obtained by acid condensation of aniline and formaldehyde, and the higher molecular weight polyamines of polyepoxides, e.g. those based on 4,4'-dihydroxy-diphenyldimethylmethane and epichlorohydring after their reaction with aliphatic, cycloaliphatic or aromatic polyamines.

One embodiment of the process according to the invention which is often of advantage consists of carrying out the hydroxymethylation reaction as a one-stage process together with the Michael additions of ethylenically unsaturated compounds; this may advantageously lead to a great increase in solubility of compounds which contain several methylol groups. This coupling of the process according to the invention is possible since anhydrous purified formaldehyde, of course, does not react with vinyl monomers under the conditions of the process of the invention, and, therefore, the hydroxymethylation reaction proceeds undisturbed in one step, together with the particular addition of vinyl monomer chosen.

Another important embodiment of the process of the invention which is particularly suitable for affecting the solubility and particularly the viscosity of the products of the process, consists of carrying out the hydroxymethylation reaction coupled with the Michael addition, with simultaneous addition of radical forming agents, for example employing the technique described in German patent application P 17 20 747.5 of telomerisation of ethylenically unsaturated compounds with polyisocyanates. In this method, the Michael addition is accompanied by polymerisation which has the effect of greatly increasing the viscosity of the products of the process. Therefore, such telomerisations may be used for exerting a controlled influence on the leveling properties, capacity for pigmentation and reduction in reactivity of the ketimines according to the purpose for which they are to be used and, thereby, also greatly increase their stability to atmospheric moisture in storage, which is very advantageous for many purposes.

The present invention makes available for the first time a large number of hydroxy-containing aldimines and ketimines which cannot be prepared by other methods. They are important products. Thus, for example, hydroxyl-containing polyaminophosphonic acid esters which are valuable flame-protective agents are obtained by the action of diethylphosphite on the compounds according to the invention. In this reaction the diethyl phosphite is added in exothermic reaction to the azomethylene double bond. Furthermore the action of carbon disulphide on the compounds according to the invention leads to polymers which are also important e.g. in the field of synthetic resins. Additional etherification, acetalisation and esterification reactions via the hydroxymethyl groups are also possible. The products of the process are particularly important as starting compounds for the polyaddition of ethylene oxide or propylene oxide, optionally after previous hydrogenation of the azomethine groups, whereby a large number of new starting compounds become available for the preparation of basic polyols which are completely odourless and very stable in storage.

According to another embodiment of the process of the invention, the compounds according to the invention are not prepared in bulk or in solution in inert solvents such as methylene chloride, chloroform, butyl acetate, dibutylether, cyclohexane, benzene, toluene, and xylene, but in linear or branched polyols such as polyols which contain ester, ether, thioether or acetal groups, e.g. linear or branched propylene glycol polyethers, because then they can be used directly with these compounds for subsequent isocyanate polyaddition reactions. Furthermore, when employing such a procedure, the removal of solvents after the hydroxymethylation reaction may be omitted.

The compounds according to the invention are above all valuable chain lengthening agents which may be used as such with polyisocyanates and optionally higher molecular weight polyols, to yield new soft elastomeric polyurethanes which have valuable properties. Due to their side chains the new compounds when used as chain lengthening agents act simultaneously as chemically linked plasticizers.

The parts given in the following examples are parts by weight unless otherwise indicated.

EXAMPLE 1

The anhydrous formaldehyde required for carrying out the hydromethylation is prepared as follows:

Monomeric formaldehyde is obtained in known manner by thermal decomposition of paraformaldehyde, e.g. in o-dichlorobenzene and mixed in the pyrolysis vessel with pure, dry nitrogen as carrier gas. The formaldehyde is then conducted through an extensive cooling system of about $-10$ to $+5°$ C. and continuously introduced into the reaction vessel.

Monomeric formaldehyde is continuously introduced with vigorously stirring into 276 parts by weight of a liquid bisketimine prepared from 2 mols of cyclohexanone and 1 mol of hexamethylene diamine. Hydroxymethylation in the $\alpha$-position to the azomethine group sets in at once with exothermic reaction at a rate depending on the rate at which the formaldehyde is introduced. There is no formation of insoluble, high molecular weight polyoxymethylenes from the start of the reaction to the end of introduction of formaldehyde. The reaction temperature is kept at 40° C. by cooling with water, and when 30 parts by weight of monomeric formaldehyde have been introduced, a sample is removed for analytic determination of the $H_2O$ contact. Even after the introduction of only one hydroxymethyl group the unpleasant amine-like odour of the starting ketimine has disappeared and a slight lightening of colour and slight increase in viscosity are observed in the ketimine which now contains hydroxyl groups. Another 30 parts by weight of monomeric formaldehyde are introduced in the course of another hour. After 2 hours, a moderately viscous bis-ketimine is obtained which is practically odourless and contains an average of two hydroxymethyl groups per mol of bis-ketimine. When another 60 parts by weight of monomeric formaldehyde are introduced into the reaction vessel, the reaction continuously progresses with a progressive increase in the viscosity of the bis-ketimine poly alcohol. In order to achieve a maximum degree of hydroxymethylation, the reaction mixture is now diluted with approximately 456 parts by weight of anhydrous xylene and a further 60 parts by weight of monomeric formaldehyde are introduced, the temperature being kept at about 55° C. A clear, yellowish, approximately 50% solution of a hydroxymethylated bis-ketimine which has the following theoretical constitution is obtained:

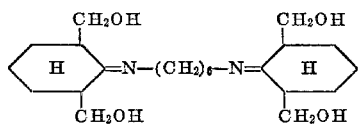

When measured as a 50% solution in xylene, this product has a viscosity at 21° C. of 4200 cp.

EXAMPLE 2

This example illustrates the high reactivity of the ketimine prepared from 2 mols of cyclohexanone and 1 mol of hexamethylene diamine towards formaldehyde even when the reaction is carried out under reduced pressure.

The process is carried out as described in Example 1 but using a monomeric formaldehyde which is pyrolysed at a total pressure of about 150 mm. Hg at a temperature of about 120° C. On leaving the pyrolysis vessel, the resulting monomeric formaldehyde gas is diluted with nitrogen and toluene vapour until the formaldehyde partial pressure is about 100 mm. Hg. This gas mixture then flows through a scrubbing flask which is filled with toluene and kept at a temperature of 35° C., and from there it is introduced into the bis-ketimine of Example 1. In this procedure, the inlets to the reaction vessel and the washing liquid remain free from prepolymers of formaldehyde. Although the process is carried out at a total pressure of only about 150 mm. Hg, the formaldehyde introduced into the reaction vessel is immediately absorbed by the bis-ketimine. When about 2 mols of monomeric formaldehyde has been introduced, further supply of formaldehyde is stopped and a pale yellow hydroxymethylated bisketimine of the following theoretical constitution is obtained.

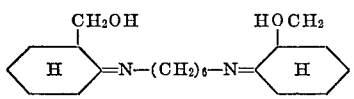

This has a viscosity of 480 cp. at 21° C. and has excellent miscibility with all polyisocyanates, and when reacted with polyisocyanates in equivalent quantities of OH and ketimine groups it yields a highly cross-linked completely insoluble synthetic resin.

EXAMPLE 3

Anhydrous formaldehyde is produced as described in Example 1 and introduced at about 40° C. into 60% by weight solutions in xylene of (a) 201 parts by weight of the ketimine formed from 1 mol of benzylamine and 1 mol of cyclohexanone,
(b) 187 parts by weight of the ketimine formed from 1 mol of aniline and 1 mol of cyclohexanone,
(c) 386 parts by weight of the bis-ketimine formed from 1 mol of 4,4'-diamino-diphenylmethane and 2 mols of cyclohexanone.

A total of 60 parts by weight of monomeric formaldehyde is introduced and the reaction mixture is kept at 60° C. for 3 minutes after the introduction of formaldehyde is terminated. Approximately 50% solution of hydroxymethylated ketimines which are hydroxymethylated with an average of 2 mols of formaldehyde per mol of ketimine and which have the following theoretical constitutions are obtained:

(a)
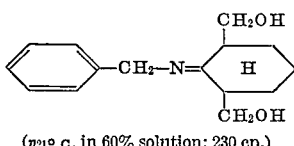
($\eta_{21}°$ c. in 60% solution: 230 cp.)

(b)
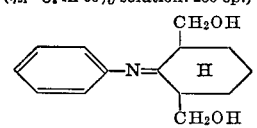
($\eta_{21}°$ c. in 60% solution: 285 cp.)

(c)
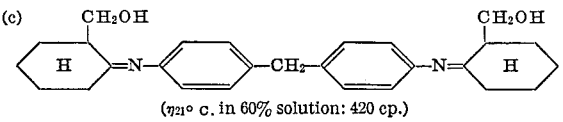
($\eta_{21}°$ c. in 60% solution: 420 cp.)

EXAMPLE 4

Anhydrous formaldehyde is produced as described in Example 1 and is introduced continuously at about 30° C. into a solution of 250 parts by weight of the poly-Schiff's base formed from 1 mol of m-xylylene diamine and 2 mols of isobutyraldehyde in a mixture of xylene/ethyl glycol acetate (1:1). A total of 60 parts by weight of monomeric formaldehyde is introduced and the reaction mixture is kept at 60° C. for one hour after introduction of formaldehyde is terminated. An approximately 50% solution of the polyaldimine is obtained. The solution is completely free from formaldehyde and the polyaldimine contains an average of two hydroxymethyl groups per molecule and has the following theoretical constitution:

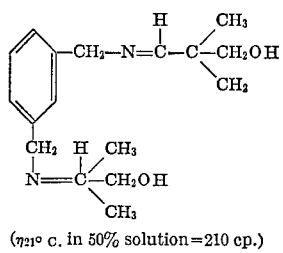
($\eta_{21}°$ c. in 50% solution = 210 cp.)

When this solution is treated with a biuret triisocyanate mixture of 1-methylbenzene-2,4-diisocyanate in an equivalent quantity as regards the hydroxyl groups, a completely crosslinked insoluble synthetic resin is obtained.

EXAMPLE 5

Anhydrous formaldehyde is produced as described in Example 1 and is introduced continuously at about 50° C. into a solution of 220 parts by weight of the poly-Schiff's base of 2 mols of butyraldehyde and 1 mol of hexamethylenediamine in 310 parts by weight of glycol monoethylether acetate. A total of 3.1 mol of formaldehyde is taken up in the course of 4 hours. An approximately 50% solution of a hydroxymethylated poly Schiff's base which is hydroxymethylated with an average of 3 mols of formaldehyde per mol and which has the following theoretical constitution

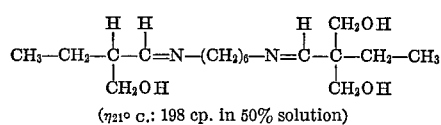
($\eta_{21}°$ c.: 198 cp. in 50% solution)

is obtained.

EXAMPLE 6

Anhydrous formaldehyde is produced as described in Example 1 and is introduced continuously at about 40° C. into a mixture of 196 parts by weight of a bis-ketimine formed from 2 mols of acetone and 1 mol of hexamethylenediamine and 265 parts by weight of xylene. When 60 parts by weight of formaldehyde have been introduced, the unpleasant odour of the starting material has completely disappeared. A partially hydroxyalkylated ketimine of 2 mols of acetone and 1 mol of hexamethylene diamine is obtained which has the following theoretical constitution:

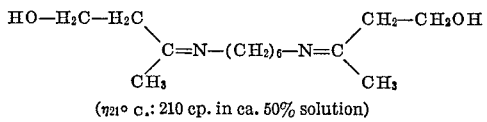
($\eta_{21}°$ c.: 210 cp. in ca. 50% solution)

When this is further worked up into polyurethane resins, it has no amine-like odour.

EXAMPLE 7

The examples summarised here show that, even with slight partial oxymethylation reactions, it is possible to prepare mixtures of hydroxyalkylated ketimine or aldimines with the starting materials, in which the amine-like odour has completely disappeared and which have great stability in storage and are compatible and miscible in solution with all industrially important polyisocyanates.

Anhydrous formaldehyde is produced as described in Example 1 and 0.05 mol of this formaldehyde is introduced into 0.1 mol of the following ketimines or aldimines:

(a) bis-ketimine formed from 1 mol of propylene-1,3-diamine and cyclohexanone
(b) bis-ketimine formed from m-xylylene diamine and cyclohexanone
(c) bis-ketimine formed from tetramethylene diamine and cyclohexanone
(d) bis-ketimine formed from isphorone diamine and cyclohexanone
(e) mono-ketimine formed from allylamine and cyclohexanone
(f) mono-ketimine formed from cyclohexylamine and cyclohexanone
(g) bis-ketimine formed from 1 mol of hexamethylenediamine and 2 mols of acetone
(h) bis-ketimine formed from 1 mol of hexamethylenediamine and 2 mols of methylisobutyl ketone
(i) bis-ketimine formed from 1 mol of hexamethylenediamine and 2 mols of methylethyl ketone (j) bis-aldimine formed from 1 mol of hexamethylenediamine and 2 mols of n-butyraldehyde (k) bis-ketimine formed from 1-methyl-2,4-diaminobenzene and 2 mols of cyclohexanone in 50% xylene solution (l) bis-ketimine formed from 4,4'-diaminodiphenylmethane and 2 mols of cyclohexanone in a 50% solution of xylene (m) bis-ketimine formed from 4,4'-diamino-diphenylether and 2 mols of cyclohexanone (n) poly-ketimine formed from higher molecular weight aniline-formaldehyde condensates with 5 mols of cyclohexanone in 50% xylene/ethyl glycol acetate solution (1;1)

(o) bis-ketimine formed from 1 mol of hexamethylenediamine and 2 mols of cyclohexanone substituted with an average of 2 cyano ethyl radicals per molecule (p) bis-ketimine formed from 1 mol of diethylene triamine and 2 mols of cyclohexanone which is cyanoethylated predominantly on its NH group.

(q) bis-ketimine formed from 1 mol of triethylene tetramine and 2 mols of cyclohexanone substituted with an average of 2 cyano ethyl radicals on both its NH groups (r) bis-ketimine formed from 1 mol of hexamethylene diamine and 2 mols of methyl isobutyl ketone substituted with an average of two cyanoethyl radicals in the α-position to the ketimine group.

Although in Examples (a) to (r) formaldehyde is introduced in very much less than the equivalent quantity so that there are obtained only solutions of partially hydroxymethylated ketimines in an excess of bis-ketimines which have not reacted with formaldehyde, the unpleasant amine-like odour has practically disappeared, or at least been very much reduced in experiments (a), (b), (c), (g), (h), (i), (j), (o), (p), (q), and (r) whereas in experiments (d), (f), (m) and (n) the colour of the ketimine solutions is observed to be very much paler.

EXAMPLE 8

60 parts by weight of anhydrous formaldehyde which has a water content of about 0.9% calculated from the end groups are dipolymerised in methanol at about 65° C., using catalytic quantities of sodium hydroxide. The monomeric formaldehyde is present mainly as semiacetal in the methanolic solution. The solution is filtered and then introduced dropwise in the course of 2 hours in an atmosphere of nitrogen and with vigorous stirring into 380 parts by weight of a ketimine formed from 1 mol of hexamethylene diamine and 2 mols of cyclohexanone which has an average of one cyanoethyl group in the α-position to the ketimine groups. The reaction mixture is then stirred for two hours at 45° C. and the methanol is completely removed in a water jet vacuum under nitrogen. A golden yellow, easily pourable hydroxymethylated and cyanoethylated polyketimine mixture is obtained which has a viscosity at 21° C. of 3820 cp., whereas the starting ketimine which is not hydroxymethylated has a viscosity of 640 cp. at the same temperature. It has the theoretical constitution:

(a)
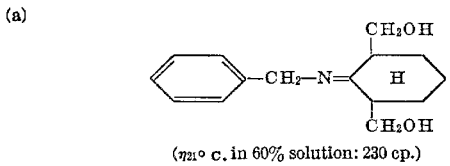
($\eta_{21}°$ c. in 60% solution: 230 cp.)

(b)
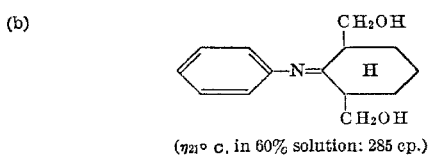
($\eta_{21}°$ c. in 60% solution: 285 cp.)

(c)
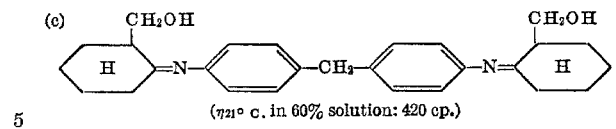
($\eta_{21}°$ c. in 60% solution: 420 cp.)

A viscosity increase of about 3200 cp. results from the hydroxymethylation reaction. Solutions of this cyanoethylated and hydroxymethylated bis-ketimine in ethyl acetate, xylene, ethylglycol acetate and butyl acetate are extremely stable in storage and compatible with any industrially important polyisocyanates.

EXAMPLE 9

The process is carried out in the same way as described in Example 8 and the semiacetal of formaldehyde is used for hydroxymethylating a cyanoethylated ketimine which has been prepared from 1 mol of hexamethylene diamine and 2 mols of methylisobutylketone in known manner and has subsequently been cyanoethylated with 2 mols of acrylonitrile. 358 parts by weight of this bis-ketimine are reacted with a total of 60 parts by weight of formaldehyde, and after complete removal of methanol in a water jet vacuum a bis-ketimine is obtained which is substituted with hydroxymethyl and cyanoethyl radicals and which is easily pourable even in the absence of solvents and which, even at a concentration of 100%, has a viscosity of only 8500 cp. at 21° C. In its 100% form it has no unpleasant odour and can be mixed with any industrially important polyisocyanates and caused to undergo polyaddition. It has the following theoretical constitution:

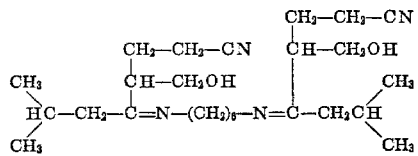

EXAMPLE 10

The procedure is carried out as described in Examples 8 and 9, and the liquid semiacetal of formaldehyde and methanol is used for hydroxymethylating a cyanoethylated ketimine which has been prepared from 1 mol of diethylene triamine and 2 mols of cyclohexanone and has been subjected to subsequent cyanoethylation with 3 mols of acrylonitrile and which is substantially free from secondary NH groups. 421 parts by weight of this bis-ketimine are reacted with a total of 60 parts by weight of formaldehyde in accordance with Example 9 and then worked up as described in Example 9. A hydroxymethylated, and cyanoethyl-containing bis-ketimine is obtained which is easily pourable at room temperature even in the absence of solvents, and which has a viscosity of only 3700 cp. at 21° C., and which can be mixed and reacted with any polyisocyanates without precipitation. It has the following theoretical constitution:

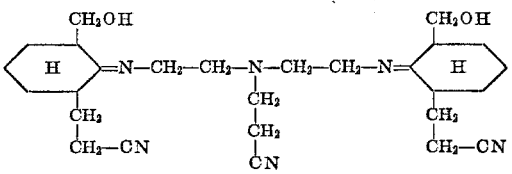

EXAMPLE 11

The same procedure is employed as described in Example 10 and the liquid semiacetal of formaldehyde and ethanol is used for hydroxymethylating a bis-ketimine which has been prepared from 1 mol of m-xylylene diamine and 2 mols of cyclohexanone and has then been cyanoethylated with an average of 2 mols of acrylonitrile. 434 parts by weight of this ketimine are reacted with 60 parts by weight of formaldehyde (as its semiacetal dissolved in ethanol). The process is carried out as described in Example 10 under a nitrogen atmosphere, and, after removal of ethanol, an almost transparent bis-ketimine, which is substituted with hydroxymethyl groups and with cyanoethyl groups, is obtained. The 100% bis-ketimine has a viscosity of approximately 29900 at 21° C. and is soluble in any amount in ethyl acetate, ethyl glycol acetate, butyl acetate, benzene and xylene and can be reacted with polyisocyanates to undergo a polyaddition reaction. It has the following theoretical constitution:

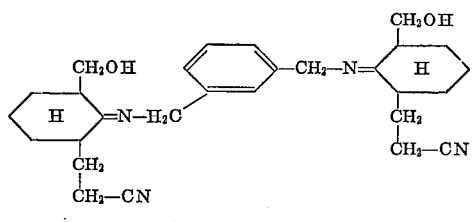

EXAMPLE 12

The examples summarized below illustrate another, technically simplified variation of the process by means of which a high degree of methylation can be achieved in the ketimines and aldimines which are reacted.

In a three-necked flask equipped with stirrer, thermometer and nitrogen inlet and an azeotropic water separator with additional reflux cooler, the following partially cyanoethylated bis-ketimines are reacted with 120 parts by weight of commercial, practically anhydrous paraformaldehyde at 90° C. and freed from small quantities of water which are held by adsorption and from water which is formed on the end groups by paraformaldehyde decomposition:

(a) 434 parts by weight of a bis-ketimine formed from m-xylylene and 2 mols of cyclohexanone which has an average of 2 mols of cyanoethyl groups.

(b) 412 parts by weight of a bis-ketimine formed from isophorone diamine (=1-aminomethyl-5-amino-1,3,3-trimethyl-cyclohexane) and 2 mols of methylisobutyl ketone which contains an average of 2 cyanoethyl groups per mol (c) 406 parts by weight of a bis-ketimine formed from 1 mol of m-xylylene diamine and 2 mols of methyl isobutylketone which has an average of two cyanoethyl groups per mol (d) 380 parts by weight of a bis-ketimine formed from 1 mol of hexamethylene diamine and 2 mols of cyclohexanone which has an average of two cyanoethyl groups per mol.

Sufficient xylene to produce approximately 50% by weight solutions are added to ketimine (a) to (d), and 120 parts by weight of commercial paraformaldehyde are added to the bisketimines in each case. The reaction mixture is rapidly stirred for about 10 minutes at room temperature and the reaction temperature of the suspension is then increased to about 90° C. under a completely nitrogen atmosphere. A slightly exothermic reaction sets in at about 65 to 70° C., paraformaldehyde slowly going into solution and monomeric formaldehyde immediately having a hydroxymethylating effect. Due to the relatively large quantity of heat of depolymerisation required for paraformaldehyde, the overall reaction is only slightly exothermic. The clear solution is stirred at 70 to 90° C. for about 3 hours, and small quantities of water are removed azeotropically under a slight vacuum, again in a nitrogen atmosphere. The readily soluble bis-ketimines which have a high degree of hydroxymethylation are obtained. They have the theoretical constitution shown in the table and can be caused to undergo polyaddition with isocyanates both in solution and in bulk.

TABLE 1

| No. | Theoretical constitution | R | Viscosity 50% solutions in xylene, cp. |
|---|---|---|---|
| 1 | (structure with HOCH₂, CH₂OH, H, N—R—N, H, HOH₂C, CH₂OH, NC—CH₂—CH₂, CH₂—CH₂CN) | benzene—CH₂—, CH₂ | 230 |
| 2 | (structure with H₃C, CH₂OH, CH—CH, H₃C, C=N—R—N=C, NC—CH₂—CH₂—CH, HOCH₂, HO—CH₂, CH₃, HC—CH, CH₃, HC—CH₂—CH₂—CN, CH₂OH) | CH₃, CH₃, H, CH₃, CH₂— | 380 |
| 3 | (structure with H₃C, CH₂OH, C—CH, H₃C, C=N—R—N=C, NC—CH₂CH₂—CH, HOCH₂, HOCH₂, CH₃, CH—CH, CH₃, HC—CH₂—CH₂—CN, CH₂OH) | benzene—CH₂—, CH₂— | 200 |
| 4 | HOCH₂ CH₂OH (structure with H, =N—(CH₂)₆—N=, H, CH₂—CH₂—CN, HOCH₂ CH₂OH, CH₂—CH₂—CN) | | 140 |

EXAMPLE 13

The procedure is carried out as descibed under (a), (b), (c) and (d) in Example 12. 60 parts by weight of paraformaldehyde are used and the xylene used in these examples is replaced by a branched propylene glycol polyether for the preparation of which trimethylolpropane was used as starting compound. The hydroxyl group content is approximately 1.9%. Approximately 552 parts by weight of this polyether are used as solvent, and after carrying out the hydroxymethylation, the solution or mixtures are freed from small quantities of water in a water jet vacuum. The solutions can be reacted with 1-methylbenzene-2,4-diisocyanate and its isomers without separation of the components or precipitation of the hydroxymethylated polyketimines. Cross-linked, elastic synthetic resins are obtained from the reaction. The hydroxymethylated polyketimines have the theoretical constitution of the formulae shown under Nos. 1, 2, 3 and 4 in Table 1.

EXAMPLE 14

The procedures described in Example 12 under (a), (b), (c) and (d) are employed, using the parts by weight of bis-ketimines indicated there, and the same parts by weight of paraformaldehyde but xylene is replaced by approximately 550 parts by weight of linear polyacetal of diethylene glycol, bis-hydroxylated butane-1,4-diol and formaldehyde with a hydroxyl content of 2.6%. After the formaldehyde addition, clear, approximately 50% solutions of hydroxymethylated bis-ketimines in linear polyacetal are obtained. The hydroxymethylated polyketimines have the theoretical constitution shown in Table 1 under Nos. 1, 2, 3 and 4. The solutions can be reacted with 1-methyl-benzene-2,4-diisocyanate, isomers and 4,4'-diisocyanato-diphenyl methane without separation of the components or precipitation of the bis-ketimines, elastic, cross-linked synthetic resins being obtained.

EXAMPLE 15

590 parts by weight of bis-ketimine formed from 1 mol of isophorone diamine and 2 mols of cyclohexanone which has an average of 2 β-carbobutoxyethyl radicals per mol (prepared by the addition of butyl acrylate) are dissolved in 710 parts by weight of a polyether which has been prepared from glycerol and trimethylolpropane (1:1) as starting material and propylene oxide/ethylene oxide (10:1) (OH number 46, viscosity at 21° C.=654 cp.). Hydroxymethylation was carried out as in Example 13 with the following parts by weight of paraformaldehyde:

(a) 60 parts by weight of paraformaldehyde
(b) 90 parts by weight of paraformaldehyde
(c) 120 parts by weight of paraformaldehyde
(d) 150 parts by weight of paraformaldehyde
(e) 180 parts by weight of paraformaldehyde.

After hydroxymethylation has been carried out, small quantities of water are removed in a water jet vacuum at 90° C.

In all cases (a) to (e) solutions of partially to highly hydroxymethylated bis-ketimines which are transparent at 20 to 60° C. are obtained. The bis-ketimines have the following theoretical constitutions:

(a)

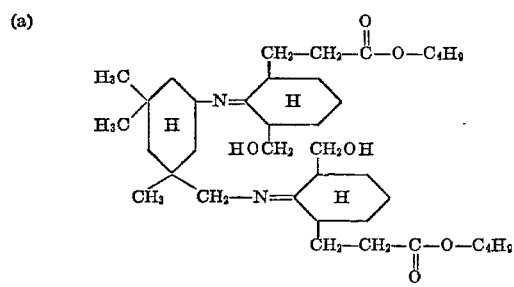

($\eta_{21°C.}$ in ca. 48% solution: 2950 cp.)

(b)

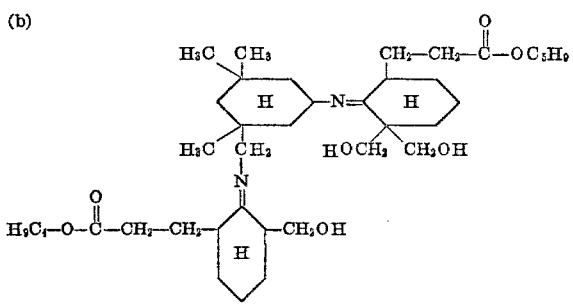

($\eta_{21°C.}$ in ca. 49% solution: 5544 cp.)

(c)

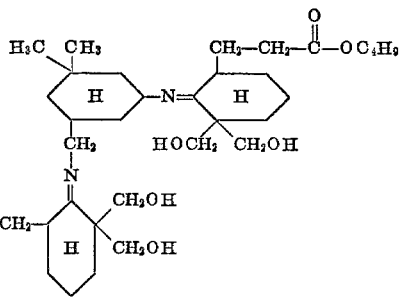

($\eta_{21°C.}$ in 50% solution: 6424 cp.)

(d)

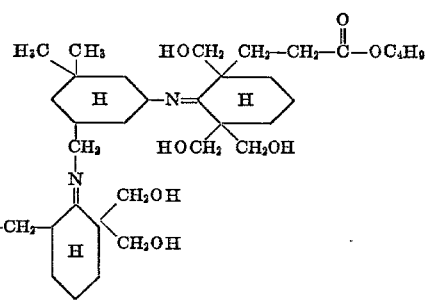

($\eta_{21°C.}$ in 51% solution: 8450 cp.)

(e)

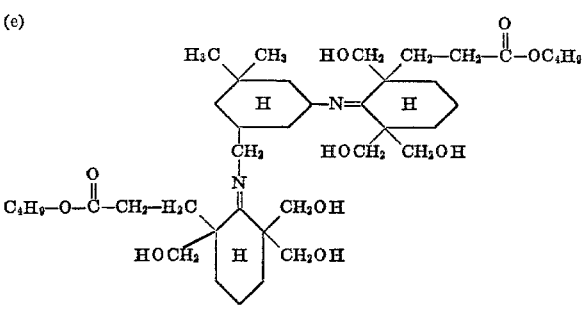

($\eta_{21°C.}$ in ca. 53% solution: 10,500 cp.)

When the solutions are reacted with equivalent quantities of 1-methylbenzene-2,4-diisocyanate, 4,4'-diisocyanate diphenylmethane and or their commercially available isomers or 4,4'-diisocyanato-diphenylether, cross-linked synthetic resins are obtained.

If the bis-ketimine of this example is replaced by the corresponding β-carbethoxy-ethyl- and β-carbopropoxy-ethyl-substituted derivatives, the corresponding hydroxymethylated bis-ketimines are obtained.

EXAMPLE 16

584 parts by weight of a bis-ketimine formed from 1 mol of m-xylylene diamine and 2 mols of cyclohexanone which has been modified by the addition of 2 mols of dimethylmaleate are dissolved in 710 parts by weight of a polyether which has the composition described in Example 15. Hydroxymethylation is then carried out as described in Example 13 with the following parts by weight of paraformaldehyde:

(a) 60 parts by weight of paraformaldehyde
(b) 90 parts by weight of paraformaldehyde
(c) 120 parts by weight of paraformaldehyde.

After hydroxymethylation with paraformaldehyde, small quantities of water are removed in a water jet vacuum at 90° C.

In all cases (a) to (c) solutions of hydroxymethylated bis-ketimines which have the following theoretical constitution are obtained:

(a)

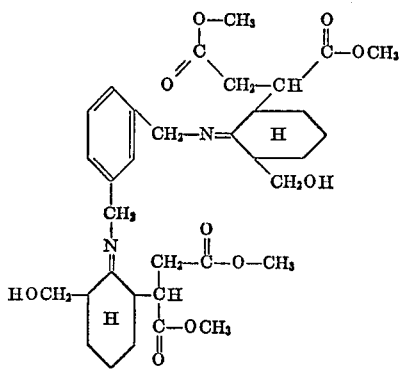

(b) as (a) with approximately 3 hydroxymethyl groups and (c) as (a) but with approximately 4 hydroxymethyl groups.

When the solutions are reacted with equivalent quantities of 1-methylbenzene-2,4 - diisocyanate, 4,4' - diisocyanato-diphenylmethane or their commercially available isomers or 4,4'-diisocyanato-diphenylether, cross-linked synthetic resins are obtained.

If the bis-ketimine of this example is replaced by a bis-ketimine of the same diamine and ketone but which has 2 mols of β-hydroxypropylmethacrylate or β-hydroxypropyl acrylate per mol attached in the α-position to the azomethine group, the corresponding hydroxymethylated bis-ketimines are obtained with paraformaldehyde.

What is claimed is:
1. A compound of the formula

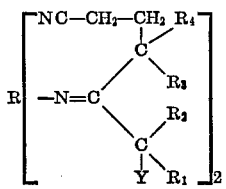

wherein R is a divalent saturated aliphatic hydrocarbon radical or

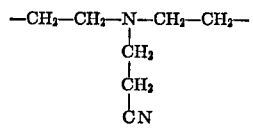

$R_1$ and $R_2$ are each selected from the group consisting of hydrogen, $C_1$–$C_{18}$ alkyl and hydroxymethyl; $R_3$ and $R_4$ are each selected from the group consisting of hydrogen, $C_1$–$C_{18}$ alkyl and hydroxymethyl; and Y is hydrogen or hydroxymethyl, said compound having 2 to 4 hydroxymethyl substituents.

2. The compound according to claim 1 having the formula

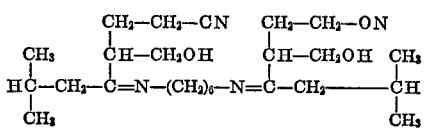

References Cited
UNITED STATES PATENTS

| | | | |
|---|---|---|---|
| 2,000,041 | 5/1935 | Semon et al. | 260—566 RX |
| 2,394,530 | 2/1946 | Bruson et al. | 260—465.5 |
| 3,420,800 | 1/1969 | Haggis | 260—566 RX |
| 3,529,023 | 9/1970 | Leshin | 260—566 R |

JOSEPH P. BRUST, Primary Examiner

U.S. Cl. X.R.

260—77.5 AT, 464, 465 E, 468 R, 471 R, 566 R